United States Patent
Hirano et al.

(10) Patent No.: US 12,533,973 B2
(45) Date of Patent: Jan. 27, 2026

(54) CONTACTLESS CHARGING DEVICE AND CONTACTLESS CHARGING METHOD

(71) Applicant: TOYOTA JIDOSHA KABUSHIKI KAISHA, Toyota (JP)

(72) Inventors: Takahiro Hirano, Gotemba (JP); Shogo Tsuge, Fuji (JP); Ryosuke Ikemura, Susono (JP); Yohei Arino, Nagoya (JP); Masaki Ito, Toyota (JP); Yuki Takahashi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 854 days.

(21) Appl. No.: 17/858,460

(22) Filed: Jul. 6, 2022

(65) Prior Publication Data
US 2023/0009125 A1    Jan. 12, 2023

(30) Foreign Application Priority Data
Jul. 12, 2021    (JP) .................... 2021-114873

(51) Int. Cl.
| | |
|---|---|
| *B60L 53/126* | (2019.01) |
| *B60L 53/12* | (2019.01) |
| *B60L 53/37* | (2019.01) |
| *B60L 53/38* | (2019.01) |
| *B60L 53/65* | (2019.01) |
| *H02J 7/00* | (2006.01) |
| *H02J 50/12* | (2016.01) |

(52) U.S. Cl.
CPC ............. *B60L 53/126* (2019.02); *B60L 53/12* (2019.02); *B60L 53/37* (2019.02); *B60L 53/38* (2019.02); *B60L 53/65* (2019.02); *H02J 7/00045* (2020.01); *H02J 50/12* (2016.02); *H02J 2310/48* (2020.01); *Y02T 90/12* (2013.01)

(58) Field of Classification Search
CPC ........ B60L 53/126; B60L 53/37; B60L 53/38; B60L 53/65; B60L 53/12; H02J 50/12; H02J 7/00045; H02J 2310/48; Y02T 90/12
USPC .......................................... 320/104, 107, 108
See application file for complete search history.

(56) References Cited

U.S. PATENT DOCUMENTS

| | | | |
|---|---|---|---|
| 10,243,415 B1 * | 3/2019 | Grundmann ............ | H02J 50/12 |
| 2014/0067660 A1 * | 3/2014 | Cornish .................. | B60L 53/37 |
| | | | 705/39 |
| 2022/0281343 A1 * | 9/2022 | Yang ........................ | B60L 53/12 |

FOREIGN PATENT DOCUMENTS

| | | |
|---|---|---|
| CN | 108749605 A | 11/2018 |
| JP | 2018-191451 A | 11/2018 |

* cited by examiner

*Primary Examiner* — Edward Tso
*Assistant Examiner* — Aaron Piggush
(74) *Attorney, Agent, or Firm* — Finnegan, Henderson, Farabow, Garrett and Dunner, LLP

(57) ABSTRACT

A controller of a contactless charging device performs a process including: acquiring vehicle information when a vehicle is present above a power transmitting device; permitting charging when it is determined that the vehicle is an electrically powered vehicle used as a taxi; starting charging; prohibiting charging when it is determined that the vehicle is not an electrically powered vehicle used as a taxi; and performing a notification process.

6 Claims, 5 Drawing Sheets

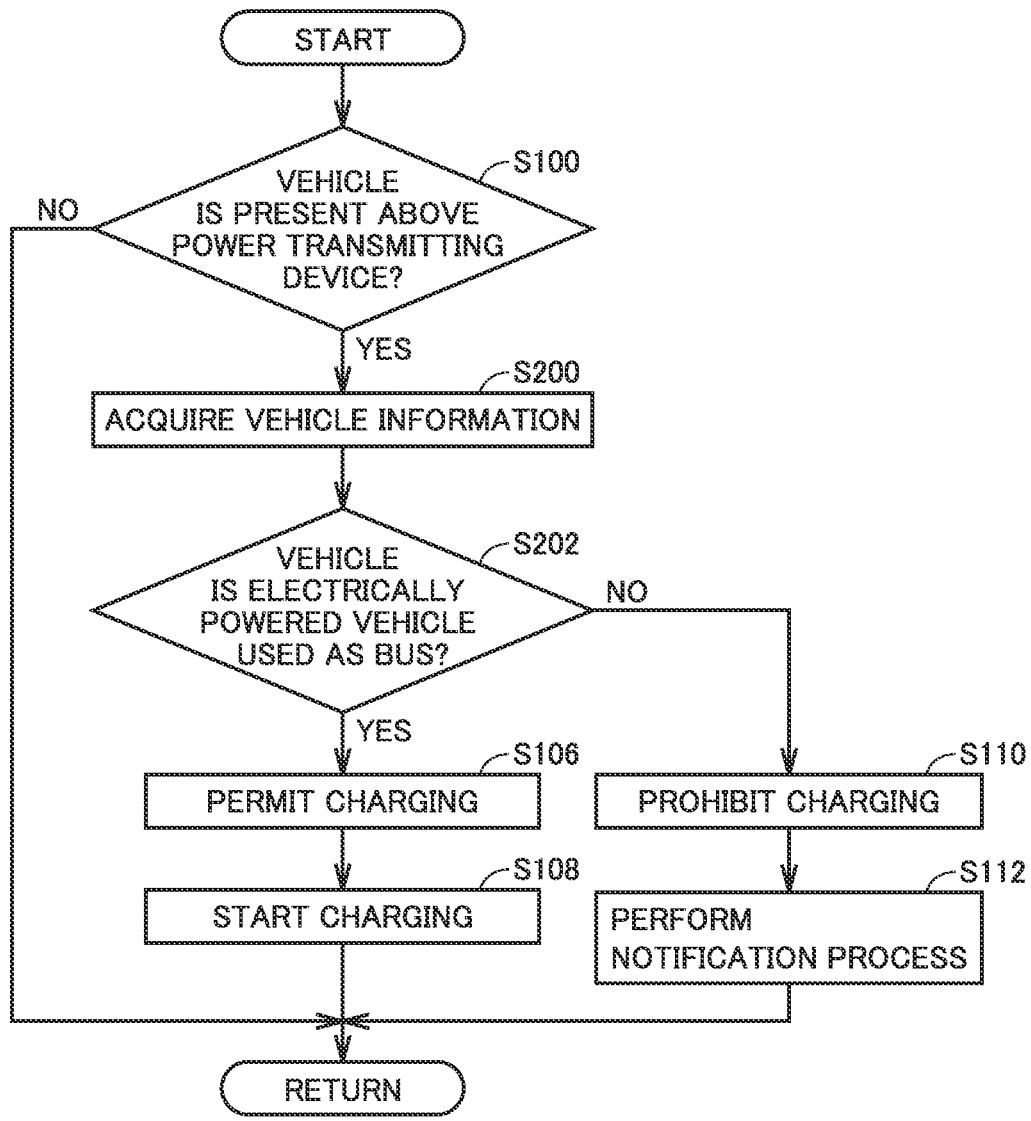

CONTACTLESS CHARGING DEVICE AND CONTACTLESS CHARGING METHOD

This nonprovisional application is based on Japanese Patent Application No. 2021-114873 filed on Jul. 12, 2021 with the Japan Patent Office, the entire contents of which are hereby incorporated by reference.

BACKGROUND

Field

The present disclosure relates to a contactless charging technique for contactlessly charging a power storage device mounted on a vehicle.

Description of the Background Art

Conventionally, contactless charging has been known as a technique for charging a power storage device mounted on an electrically powered vehicle. Contactless charging is performed onto a power storage device mounted on the electrically powered vehicle by using power contactlessly received by a power receiving device on the vehicle side from a power transmitting device connected to a power supply external to the electrically powered vehicle, not via a contact point.

Regarding such contactless charging, for example, Japanese Patent Laying-Open No. 2018-191451 discloses a technique for charging a power storage device mounted on an appropriate electrically powered vehicle to be charged by verifying identification information registered in advance and identification information received from an electrically powered vehicle and by starting and halting transmission of power when these pieces of identification information are matched with each other.

SUMMARY

Such contactless charging as described above may be performed, for example, in a standby site for an electrically powered vehicle used to provide a predetermined service such as a taxi. By performing contactless charging in such a standby site, charging can be performed using a standby period until start of service, so that the power storage device can be efficiently charged.

However, in the case where only a specific electrically powered vehicle is permitted to utilize the contactless charging, when the identification information set for each vehicle is used to determine whether to perform the contactless charging as described above, an electrically powered vehicle also used as taxi may be unable to utilize the contactless charging in the standby site unless the identification information thereof is not registered in advance, for example. Therefore, the contactless charging cannot be utilized during standby, with the result that the service may be unable to be continuously provided.

An object of the present disclosure is to provide a contactless charging device and a contactless charging method, by each of which a power storage device mounted on an electrically powered vehicle used to provide a predetermined service can be charged as a charging target.

A contactless charging device according to an aspect of the present disclosure is a contactless charging device capable of contactlessly charging a power storage device mounted on an electrically powered vehicle used to provide a predetermined service. The electrically powered vehicle includes a power receiving device that receives power from the contactless charging device. The contactless charging device includes: a power transmitting device that is capable of transmitting power to the power receiving device when the electrically powered vehicle is stopped at a predetermined position in a stop space set as a standby site for the electrically powered vehicle; an acquisition device that acquires, from an external device external to the contactless charging device, information indicating that the electrically powered vehicle is stopped in the stop space; and a controller that controls the power transmitting device. The controller determines, using the information acquired using the acquisition device, whether or not a vehicle stopped in the stop space is the electrically powered vehicle used to provide the predetermined service. When it is determined that the vehicle is the electrically powered vehicle used to provide the predetermined service, the controller permits transmission of power from the power transmitting device to the power receiving device.

In this way, when it is determined that the vehicle stopped in the stop space is the electrically powered vehicle used to provide the predetermined service such as a taxi or bus using the information acquired using the acquisition device, the transmission of power from the power transmitting device to the power receiving device is permitted. Therefore, when the vehicle is the electrically powered vehicle used to provide the predetermined service, contactless charging can be performed. As a result, by utilizing the contactless charging device during the standby of the electrically powered vehicle used to provide the predetermined service in the standby site, the service can be provided continuously.

In an embodiment, when it is determined that the vehicle stopped in the stop space is not the electrically powered vehicle used to provide the predetermined service, the controller prohibits the transmission of power from the power transmitting device to the power receiving device.

In this way, since the vehicle stopped in the stop space cannot utilize the contactless charging, the vehicle that is not the electrically powered vehicle used to provide the predetermined service can be suppressed from occupying the standby site for the purpose of charging.

In another embodiment, the external device includes an image capturing device that captures an image of the vehicle stopped in the stop space. The controller determines, using the image captured by the image capturing device, whether or not the vehicle stopped in the stop space is the electrically powered vehicle used to provide the predetermined service.

In this way, it can be precisely determined using the image captured by the image capturing device whether or not the vehicle stopped in the stop space is the electrically powered vehicle used to provide the predetermined service such as a taxi or bus. Therefore, contactless charging can be utilized only for the electrically powered vehicle used to provide the predetermined service.

In still another embodiment, the image capturing device captures an image of an exterior portion of the vehicle stopped in the stop space. When a characteristic portion as the electrically powered vehicle used to provide the predetermined service is included in the exterior portion of the vehicle stopped in the stop space, the controller determines that the vehicle stopped in the stop space is the electrically powered vehicle used to provide the predetermined service.

In this way, it can be precisely determined whether or not the vehicle stopped in the stop space is the electrically powered vehicle used to provide the predetermined service such as a taxi or bus.

In yet another embodiment, the image capturing device captures an image of a predetermined position of a lower surface of the vehicle stopped in the stop space. When a predetermined image is included in the captured image of the predetermined position, the controller determines that the vehicle stopped in the stop space is the electrically powered vehicle used to provide the predetermined service.

In this way, it can be precisely determined whether or not the vehicle stopped in the stop space is the electrically powered vehicle used to provide the predetermined service.

In still another embodiment, the electrically powered vehicle is a taxi. The power transmitting device is installed in a stop space set as a standby site for the taxi.

In this way, when the vehicle stopped in the stop space is the electrically powered vehicle used as the taxi, the contactless charging device can be utilized during standby in the standby site. Therefore, the service can be continuously provided.

In yet another embodiment, the electrically powered vehicle is a bus. The power transmitting device is installed in the stop space set as a standby site for the bus.

In this way, when the stopped vehicle in the stop space is the electrically powered vehicle used as the bus, the contactless charging device can be utilized during standby in the standby site without registering identification information in advance. Therefore, the service can be continuously provided.

Further, in still another embodiment, when it is determined that the vehicle stopped in the stop space is not the electrically powered vehicle used to provide the predetermined service, the controller notifies that the vehicle stopped in the stop space is not to be charged.

In this way, a vehicle that is not the electrically powered vehicle used to provide the predetermined service can be suppressed from occupying the standby site for the purpose of charging.

A contactless charging method according to another aspect of the present disclosure is a method of performing contactless charging by using a power transmitting device to transmit power to a power storage device mounted on an electrically powered vehicle used to provide a predetermined service. The electrically powered vehicle includes a power receiving device that receives the power from the power transmitting device when the vehicle is stopped at a predetermined position in a stop space set as a standby site for the electrically powered vehicle. The contactless charging method includes: acquiring, from an external device, information indicating that the electrically powered vehicle is stopped in the stop space; determining, using the acquired information, whether or not a vehicle stopped in the stop space is the electrically powered vehicle used to provide the predetermined service; and permitting transmission of power from the power transmitting device to the power receiving device when it is determined that the vehicle stopped in the stop space is the electrically powered vehicle used to provide the predetermined service.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 5 is a flowchart showing an exemplary process performed by the controller in a modification.

DESCRIPTION OF THE PREFERRED EMBODIMENTS

Figure 1:
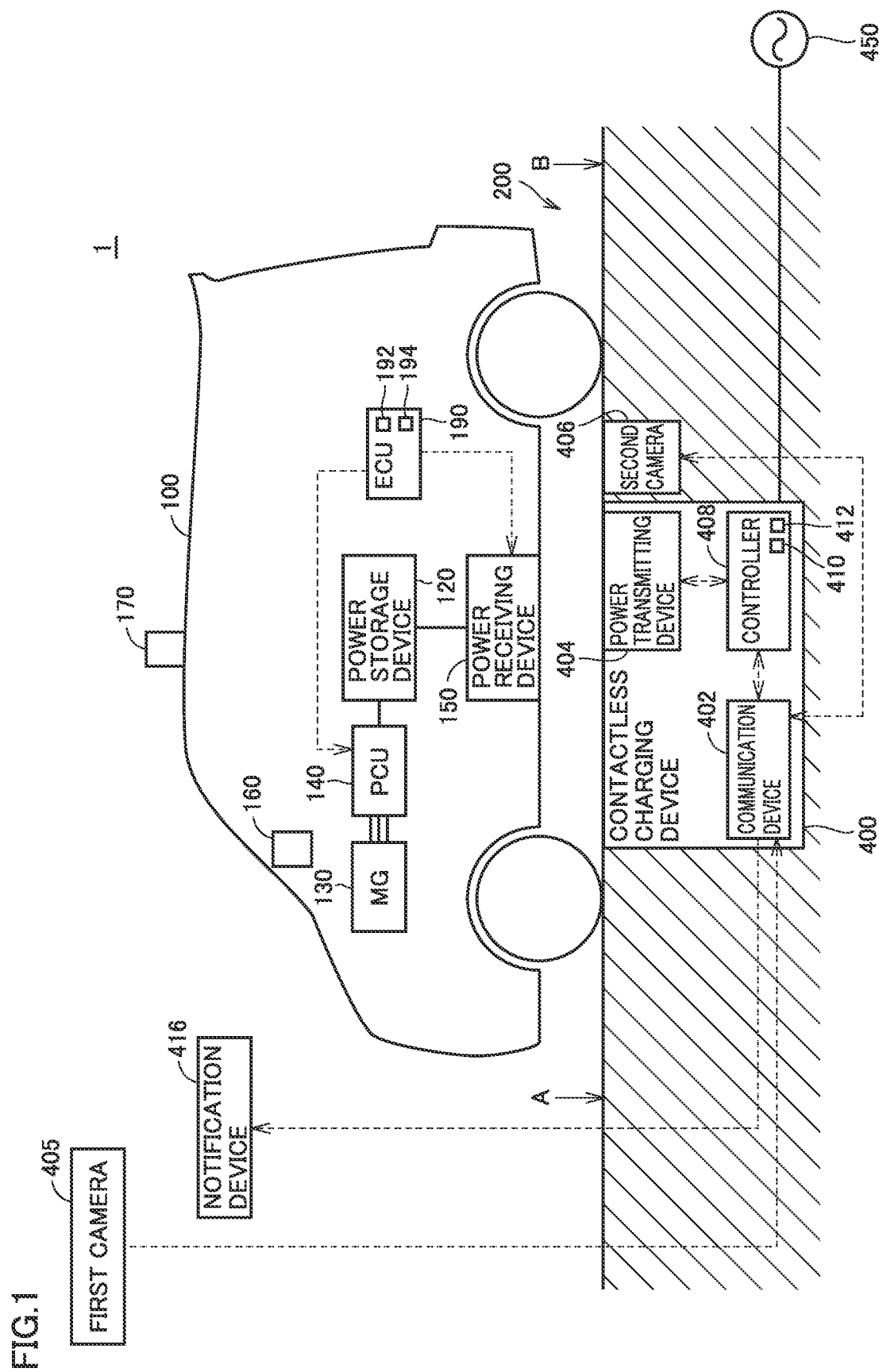
FIG. 1 is a diagram showing an exemplary configuration of a contactless charging system according to the present embodiment.

Hereinafter, embodiments of the present disclosure will be described in detail with reference to figures. It should be noted that in the figures, the same or corresponding portions are denoted by the same reference characters, and will not be described repeatedly.

FIG. 1 is a diagram showing an exemplary configuration of a contactless charging system 1 according to the present embodiment. Referring to FIG. 1, contactless charging system 1 includes an electrically powered vehicle 100, a contactless charging device 400, a first camera (acquisition device) 405, a second camera 406, a notification device 416, and a system power supply 450.

Electrically powered vehicle 100 is an electrically powered vehicle used to provide a predetermined service. In the present embodiment, for example, the following illustratively describes a case where electrically powered vehicle 100 is an electrically powered vehicle used as a taxi. FIG. 1 illustratively shows a case where electrically powered vehicle 100 is stopped in a stop space 200 set as a standby site for taxi. Stop space 200 is set between an arrow A and an arrow B in FIG. 1. Contactless charging device 400 is installed under the ground in stop space 200 at a position at which power can be transmitted to electrically powered vehicle 100.

Hereinafter, a detailed configuration of electrically powered vehicle 100 will be described. Electrically powered vehicle 100 is, for example, a battery electric vehicle or a hybrid electric vehicle. Electrically powered vehicle 100 includes a power storage device 120, an MG (Motor Generator) 130, a PCU (Power Control Unit) 140, a power receiving device 150, and an ECU (Electronic Control Unit) 190.

Power storage device 120 is a chargeable/dischargeable DC power supply. Power storage device 120 includes, for example, a secondary battery such as a nickel-metal hydride battery or a lithium ion battery having a liquid or solid electrolyte, and a power storage element such as an electric double layer capacitor.

MG 130 is, for example, a three-phase AC rotating electrical machine, and has a function as an electric motor (motor) and has a function as a power generator (generator). Output torque of MG 130 is transmitted to driving wheels through a speed reducer, a differential arrangement, and the like. It should be noted that FIG. 1 shows a configuration in which only one MG is provided; however, the number of MGs mounted on electrically powered vehicle 100 is not limited thereto, and there may be employed a configuration in which a plurality of MGs (for example, two MGs) are provided.

PCU 140 includes an inverter, a converter, and the like, and converts DC power supplied from power storage device 120 into AC power and supplies the AC power to MG 130 in accordance with a control signal from ECU 190. Thus, traveling driving force of electrically powered vehicle 100 is generated in MG 130. Alternatively, PCU 140 converts AC power generated by a regenerative operation of MG 130 into DC power and supplies the DC power to power storage device 120. Power storage device 120 is charged with the DC power supplied from PCU 140.

Power receiving device 150 contactlessly receives AC power from contactless charging device 400 (i.e., not via a contact point between power receiving device 150 and contactless charging device 400), converts the received AC power into DC power having desired voltage, and supplies the DC power to power storage device 120. Power storage device 120 is also charged with DC power supplied from power receiving device 150.

Power receiving device 150 includes, for example, a resonator (not shown) and a rectifier (not shown). The resonator is, for example, an LC resonator including a power receiving coil and a capacitor. The rectifier converts the AC power received by the resonator into DC power.

ECU 190 includes a CPU (Central Processing Unit) 192 and a memory 194, and controls each device (for example, PCU 140, power receiving device 150, or the like) of electrically powered vehicle 100 based on information stored in memory 194 or information from each sensor (not shown). The control performed by ECU 190 is not limited to software processing, and can be performed through processing by dedicated hardware (electronic circuit).

Electrically powered vehicle 100 used as a taxi further includes a first indicator lamp 160 and a second indicator lamp 170. First indicator lamp 160 is provided at a predetermined position in the vehicle (for example, on a dashboard on the passenger seat side), and indicates text information indicating a state of the taxi (for example, "vacant", "hired", or the like) to outside of the vehicle in a frontward direction of the vehicle. Second indicator lamp 170 is, for example, a company indicator lamp provided on a roof portion of electrically powered vehicle 100. Indication states (lighting states) of first indicator lamp 160 and second indicator lamp 170 are automatically switched by ECU 190 or are manually switched, for example.

Hereinafter, a detailed configuration of contactless charging device 400 will be described. As described above, contactless charging device 400 is installed under the ground in stop space 200 set in the standby site for taxi, and is configured to contactlessly transmit power from system power supply 450 to electrically powered vehicle 100.

Specifically, contactless charging device 400 includes a communication device 402, a power transmitting device 404, and a controller 408.

Communication device 402 is configured to communicate with each of first camera 405, second camera 406, and notification device 416. Communication device 402 receives, for example, data indicating an image (still image or moving image) captured by first camera 405, and transmits the received data to controller 408. Further, communication device 402 receives, for example, data indicating an image (still image or moving image) captured by second camera 406, and transmits the received data to controller 408. Further, communication device 402 receives a control command from controller 408, and transmits the received control command to at least one control target of first camera 405, second camera 406, and notification device 416.

Power transmitting device 404 adjusts AC power supplied from system power supply 450, and contactlessly transmits the adjusted AC power to power receiving device 150. Power transmitting device 404 includes, for example, a resonator (not shown) and a converter (not shown). The resonator is, for example, an LC resonator including a power transmitting coil and a capacitor. The resonator of power transmitting device 404 is configured to have a resonance frequency substantially coinciding with the resonance frequency of the resonator of power receiving device 150. The converter is connected to system power supply 450, adjusts the frequency and voltage of the AC power supplied from system power supply 450, and supplies the adjusted AC power to the resonator of power transmitting device 404.

Controller 408 includes a CPU (Central Processing Unit) 410 and a memory 412, and controls a device (for example, power transmitting device 404) of contactless charging device 400 based on information stored in memory 412 and information from external devices (for example, first camera 405 and second camera 406). The control performed by controller 408 is not limited to processing by software, and may be performed by dedicated hardware (electronic circuit).

Hereinafter, configurations of the external devices connected to contactless charging device 400 will be described. First camera 405, second camera 406, and notification device 416 are connected to contactless charging device 400 as the external devices.

First camera 405 is installed at a position at which an image of an exterior portion of the vehicle stopped in stop space 200 can be captured. For example, first camera 405 may be provided at a position at which an image of the roof portion of electrically powered vehicle 100 or the portion of the windshield of electrically powered vehicle 100 can be captured. First camera 405 may be installed to face electrically powered vehicle 100 from above or obliquely above electrically powered vehicle 100 stopped in stop space 200, for example.

First camera 405 may capture a still image or a moving image. First camera 405 captures an image in accordance with a control signal from controller 408 of contactless charging device 400. First camera 405 is configured to transmit data indicating the captured image to controller 408 of contactless charging device 400.

Second camera 406 is provided at a position at which an image of a predetermined position of the lower surface of the vehicle stopped in stop space 200 can be captured. For example, second camera 406 includes a fisheye lens, and is provided to orient above contactless charging device 400. Second camera 406 captures an image of a space above contactless charging device 400 by the fisheye lens.

Second camera 406 may capture a still image or a moving image. Second camera 406 captures an image in accordance with a control signal from controller 408 of contactless charging device 400. Second camera 406 is configured to transmit data indicating the captured image to controller 408 of contactless charging device 400. Second camera 406 can capture an image of a predetermined position of the lower surface of the vehicle stopped in stop space 200. Further, when the stopped vehicle is electrically powered vehicle 100, second camera 406 can capture an image for determining whether or not a positional relation between power receiving device 150 and contactless charging device 400 is such a positional relation that contactless charging can be performed.

Notification device 416 is configured to notify predetermined information to the vehicle stopped in stop space 200 in accordance with a control signal from controller 408 of contactless charging device 400. Notification device 416 may be constituted of a display device, may be constituted of a sound generating device, or may be constituted of a display device and a sound generating device, for example.

In contactless charging system 1 having the above-described configuration, when electrically powered vehicle 100, which is a taxi, is stopped in stop space 200 of the standby site, contactless charging control for charging power storage device 120 using power received from contactless charging device 400 can be performed.

Figure 2:
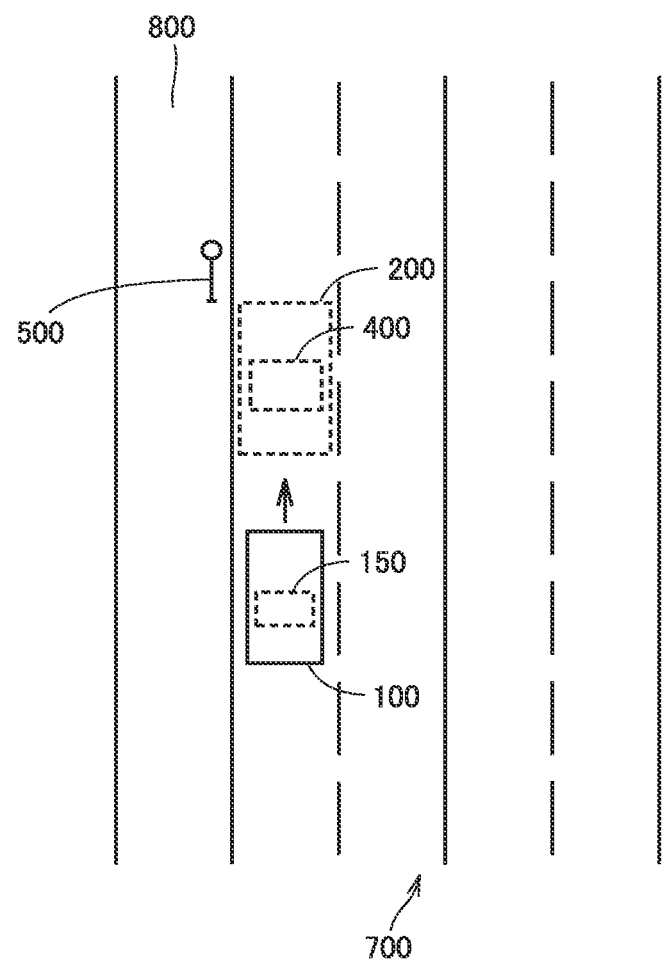
FIG. 2 is a diagram for illustrating contactless charging control performed in a standby site for taxi.

FIG. 2 is a diagram for illustrating contactless charging control performed in the standby site for taxi. As shown in FIG. 2, a walkway 800 is set along a road 700 having two lanes each way, and a sign 500 representing a taxi standby site (taxi stand) is placed at a predetermined position of walkway 800. Stop space 200 is set in a lane of road 700 adjacent to walkway 800 on a side before sign 500 in the traveling direction. Contactless charging device 400 is installed under the ground in stop space 200.

A user of electrically powered vehicle 100 used as a taxi moves electrically powered vehicle 100 to stop space 200 of the standby site in order to wait for a customer, and parks electrically powered vehicle 100 in stop space 200. On this occasion, when a positional relation between electrically powered vehicle 100 and contactless charging device 400 becomes such a positional relation that contactless charging control can be performed, the contactless charging control is performed.

Specifically, for example, in the case where electrically powered vehicle 100 is stopped in stop space 200, when the positional relation between electrically powered vehicle 100 and contactless charging device 400 becomes such a positional relation that the contactless charging control can be performed, power is transmitted from contactless charging device 400. Power storage device 120 is charged with the power received by power receiving device 150.

In contactless charging system 1 having the above-described configuration, the contactless charging is performed in the standby site for electrically powered vehicle used for the predetermined service such as a taxi as described above. Thus, charging can be performed during a waiting period until start of service (i.e., until start of hired traveling). Therefore, power storage device 120 can be efficiently charged.

On the other hand, when such a space allowing for contactless charging is installed in the lane of road 700, it is considered that a vehicle other than taxi occupies the standby site for taxi for the purpose of charging in the standby site. Therefore, in order to avoid such a situation, identification information such as an ID is transmitted from electrically powered vehicle 100 to contactless charging device 400, for example. The identification information is verified against identification information of a vehicle registered in advance on the contactless charging device 400 side as a vehicle permitted to utilize contactless charging device 400. When the received identification information is matched with the registered identification information, the contactless charging can be permitted to be performed.

However, in the case where such identification information is used to determine whether to permit to perform the contactless charging, an electrically powered vehicle also used as a taxi may be unable to utilize the contactless charging in the standby site for taxi unless the identification information thereof is registered in advance. Therefore, the contactless charging cannot be used during the standby, and standby time for charging is required, with the result that service as a taxi may be unable to be continuously provided.

In view of this, in the present embodiment, controller 408 is configured to operate as follows. That is, controller 408 acquires, from an external device external to contactless charging device 400, information indicating that electrically powered vehicle 100 is stopped in stop space 200. Controller 408 determines, using the acquired information, whether or not the vehicle stopped in stop space 200 is a taxi. When it is determined that the stopped vehicle is a taxi, controller 408 permits transmission of power from power transmitting device 404 to power receiving device 150. In the present embodiment, controller 408 determines whether or not the stopped vehicle is a taxi using an image captured using first camera 405.

In this way, the contactless charging can be performed when the vehicle stopped in stop space 200 is a taxi. As a result, by utilizing contactless charging device 400 during the standby in the standby site for taxi, the service can be continuously provided as taxi.

Figure 3:
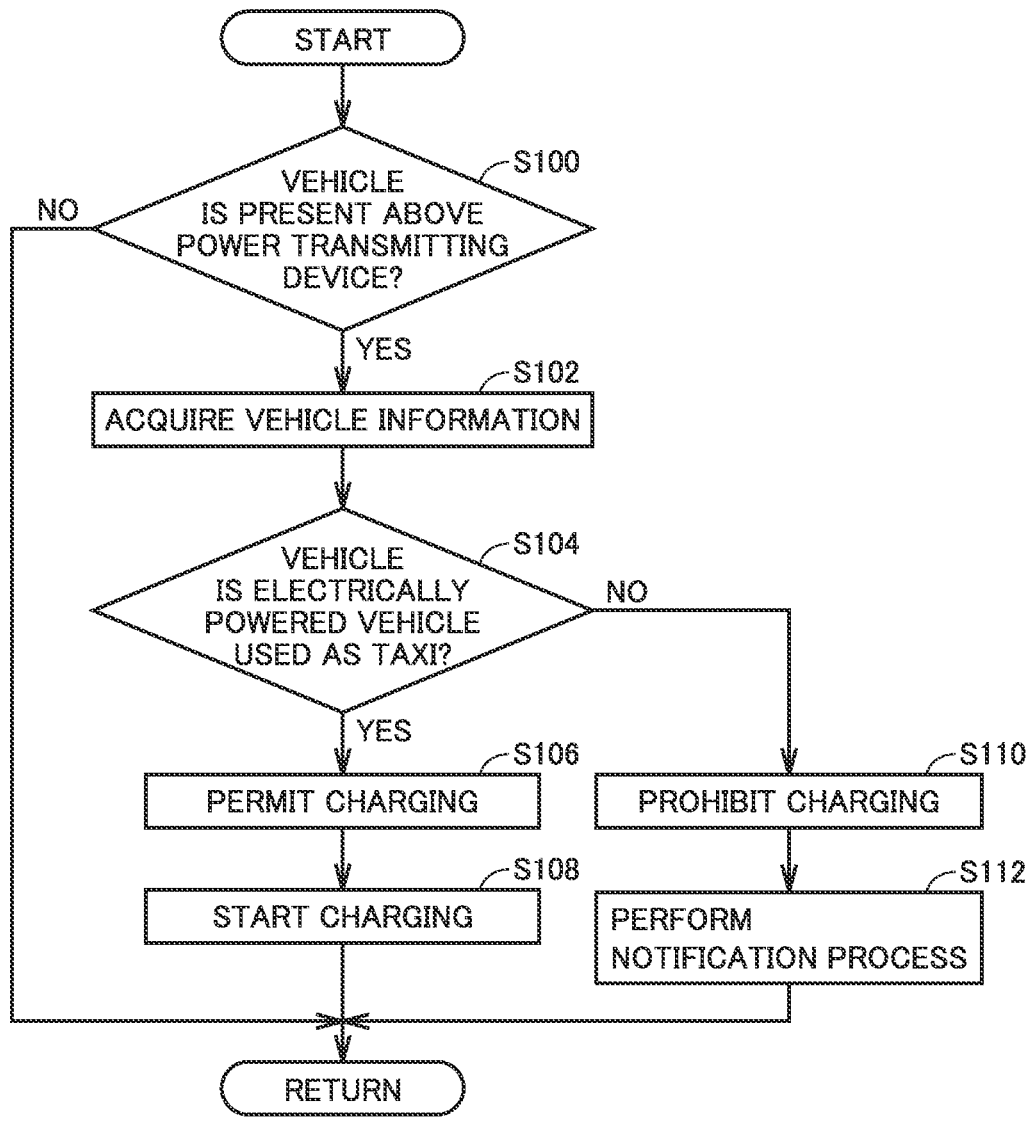
FIG. 3 is a flowchart showing an exemplary process performed by a controller.

The following describes an exemplary process performed by controller 408 with reference to FIG. 3. FIG. 3 is a flowchart showing an exemplary process performed by controller 408. A series of processes shown in this flowchart are repeatedly performed per predetermined control cycle.

In a step (hereinafter, the term "step" will be abbreviated as "S") 100, controller 408 determines whether or not the vehicle is present above power transmitting device 404 of contactless charging device 400. For example, when an image indicating a vehicle located above power transmitting device 404 is included in the image captured using first camera 405, controller 408 determines that the vehicle is present above power transmitting device 404. Controller 408 employs image analysis using AI (Artificial Intelligence) or the like such as machine learning so as to determine whether or not an image indicating a vehicle located above power transmitting device 404 is included in the image captured using first camera 405, for example. It should be noted that a known technique may be used as a detailed determination method employing image analysis, and the technique will not be described in detail. It should be noted that when an image indicating a lower surface of a vehicle is included in the image captured using second camera 406, controller 408 may determine that the vehicle is present above power transmitting device 404, for example. When it is determined that the vehicle is present above power transmitting device 404 (YES in S100), the process proceeds to S102.

In S102, controller 408 acquires vehicle information. Specifically, as the vehicle information, controller 408 acquires a characteristic portion as taxi from the image captured using first camera 405. For example, as the vehicle information, controller 408 acquires an image indicating the roof portion of the vehicle and an image indicating the portion of the windshield of the vehicle, both the images being extracted from the image captured using first camera 405.

In S104, controller 408 determines whether or not the vehicle is an electrically powered vehicle used as a taxi. For example, controller 408 may employ the above-described image analysis using AI or the like to determine whether or not an image indicating first indicator lamp 160 or second indicator lamp 170 is included in the image acquired as the vehicle information. When it is determined that the vehicle is an electrically powered vehicle used as a taxi (YES in S104), the process proceeds to S106.

In S106, controller 408 permits charging. For example, controller 408 permits charging by setting a permission flag to an ON state.

In S108, controller 408 starts charging. Specifically, for example, when the permission flag is in the ON state and the positional relation between power transmitting device 404 and power receiving device 150 is such a positional relation that contactless charging can be performed, controller 408 controls power transmitting device 404 to supply power to power receiving device 150. For example, controller 408 may use the image captured using second camera 406 to determine whether or not the positional relation between power transmitting device 404 and power receiving device 150 is such a positional relation that contactless charging can be performed. It should be noted that when the permission flag is in an OFF state or when the positional relation between power transmitting device 404 and power receiving device 150 is not such a positional relation that contactless charging can be performed, controller 408 brings power transmitting device 404 to a power transmission halt state. When it is determined that the vehicle is not an electrically powered vehicle used as a taxi (NO in S104), the process proceeds to S110.

In S110, controller 408 prohibits charging. Controller 408 prohibits charging by setting the permission flag to the OFF state, for example.

In S112, controller 408 performs a notification process. Specifically, for example, controller 408 uses notification device 416 to perform the notification process so as to notify the user of the vehicle stopped in stop space 200 that the stopped vehicle is not to be contactlessly charged. It should be noted that controller 408 may use notification device 416 to further notify and urge the user to move the vehicle from stop space 200.

Figure 4:
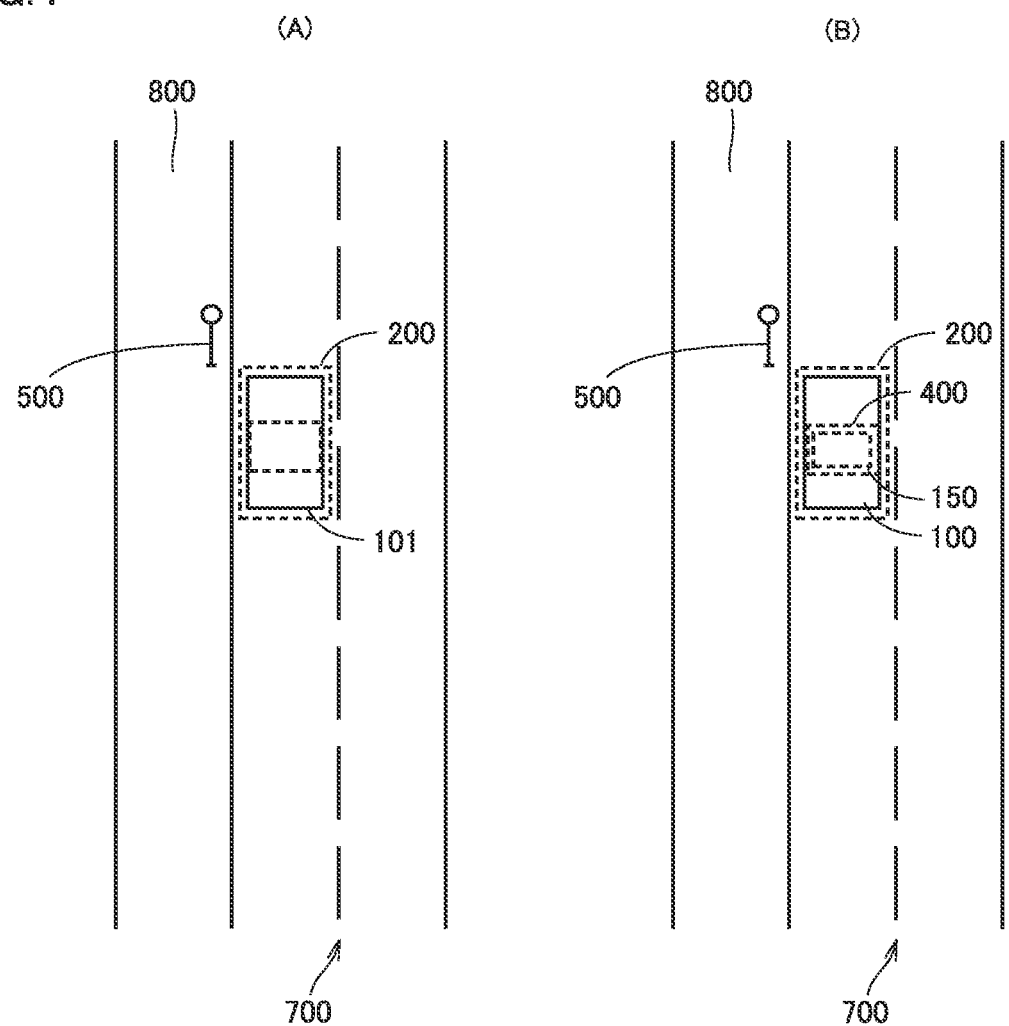
FIG. 4 is a diagram for illustrating an operation of the contactless charging device performed in accordance with a vehicle stopped in the standby site.

The following describes an exemplary operation of controller 408 according to the present embodiment based on the above-described structure and flowchart with reference to FIG. 4. FIG. 4 is a diagram for illustrating the operation of contactless charging device 400 performed in accordance with the vehicle stopped in the standby site.

Each of FIGS. 4 (A) and 4 (B) shows: road 700 having two lanes each way (only the two lanes are shown); walkway 800 set along road 700; sign 500 placed on walkway 800; stop space 200 placed on the lane of road 700 adjacent to walkway 800; and contactless charging device 400 installed under the ground in stop space 200.

FIG. 4 (A) shows a state in which a vehicle 101, which is not a taxi, is stopped in stop space 200. FIG. 4 (B) shows a state in which electrically powered vehicle 100 used as a taxi is stopped in stop space 200.

As shown in FIG. 4 (A), for example, when vehicle 101, which is not a taxi, is stopped in stop space 200, it is determined using the image captured using first camera 405 that the vehicle is present above power transmitting device 404 (YES in S100). An image of the roof portion of the vehicle and an image of the windshield portion of the vehicle are acquired as the vehicle information from the image captured using first camera 405 (S102).

When the acquired image of the windshield portion does not include an image indicating first indicator lamp 160, or when the image of the roof portion of the vehicle does not include an image indicating second indicator lamp 170, it is determined that the stopped vehicle is not electrically powered vehicle 100 used as a taxi (NO in S104). Accordingly, charging is prohibited (S110) and the notification process is performed (S112). Therefore, notification device 416 is used to notify to vehicle 101 that vehicle 101 is not to be contactlessly charged. Therefore, since no charging is to be performed, the user of vehicle 101 has to move vehicle 101.

On the other hand, as shown in FIG. 4 (B), for example, when electrically powered vehicle 100 used as a taxi is stopped in stop space 200, it is determined using the image captured using first camera 405 that the vehicle is present above power transmitting device 404 (YES in S100). An image of the roof portion of the vehicle and an image of the windshield portion of the vehicle are acquired as the vehicle information from the image captured using first camera 405 (S102).

When the acquired image of the windshield portion includes an image indicating first indicator lamp 160 and the image of the roof portion of the vehicle includes an image indicating second indicator lamp 170, it is determined that the stopped vehicle is electrically powered vehicle 100 used as a taxi (YES in S104). Therefore, charging is permitted, and when the positional relation between power transmitting device 404 and power receiving device 150 is such a positional relation that contactless charging can be performed, charging is started (S108).

In this way, according to contactless charging device 400 in the present embodiment, contactless charging can be performed as long as the vehicle stopped in stop space 200 is a taxi. As a result, by utilizing contactless charging device 400 during the standby in the standby site for taxi, service can be continuously provided as taxi. Accordingly, there can be provided a contactless charging device and a contactless charging method, by each of which a power storage device mounted on an electrically powered vehicle used to provide a predetermined service can be charged as a charging target.

Further, when the vehicle stopped in stop space 200 is not electrically powered vehicle 100 used as a taxi, contactless charging cannot be utilized. Therefore, the vehicle other than taxi can be suppressed from occupying the standby site for the purpose of charging.

Further, by using the image captured using first camera 405, it can be precisely determined whether or not the vehicle is a vehicle used as a taxi.

Hereinafter, modifications will be described.

In the embodiments described above, a taxi has been described as an exemplary vehicle used to provide a predetermined service. However, the vehicle used to provide the predetermined service is not particularly limited to a taxi, and may be, for example, a bus.

An exemplary process performed by controller 408 in the modification will be described below with reference to FIG. 5. FIG. 5 is a flowchart showing an exemplary process performed by controller 408 in the modification. A series of processes shown in this flowchart are repeatedly performed per predetermined control cycle.

It should be noted that the processes of S100, S106, S108, S110 and S112 in FIG. 5 are respectively the same as the processes of S100, S106, S108, S110 and S112 in FIG. 3 except for cases described below. Therefore, the processes of S100, S106, S108, S110, and S112 in FIG. 5 will not be described in detail repeatedly.

When it is determined that the vehicle is present above power transmitting device 404 (YES in S100), the process proceeds to S200.

In S200, controller 408 acquires vehicle information. Specifically, as the vehicle information, controller 408 acquires a characteristic portion as bus from the image captured using first camera 405. For example, as the vehicle information, controller 408 acquires an image indicating a front surface of the vehicle and an image indicating a portion of an outer contour of the vehicle, both the images being extracted from the image captured using first camera 405.

In S202, controller 408 determines whether or not the vehicle is an electrically powered vehicle used as a bus. For example, when the image indicating the front surface of the vehicle is matched with a front surface shape of a bus and the image indicating the outer contour of the vehicle is matched with an outer contour shape of an bus, controller 408 determines that the vehicle is an electrically powered vehicle used as a bus. For example, controller 408 may employ image analysis using AI or the like such as machine learning to determine whether or not the image acquired as the vehicle information is matched with the front surface shape or outer contour shape of the bus. When it is determined that the vehicle is an electrically powered vehicle used as a bus (YES in S202), the process proceeds to S106. It should be noted that when it is determined that the vehicle is not an electrically powered vehicle used as a bus (NO in S202), the process proceeds to S110.

Also in this way, contactless charging can be performed as long as the vehicle stopped in stop space 200 is a bus. As a result, by utilizing contactless charging device 400 during the standby in the standby site for bus, service can be continuously provided as a bus.

Further, in the above-described embodiment, a taxi has been described as an exemplary vehicle used to provide a predetermined service; however, the vehicle is not particularly limited to a taxi, and may be a rental car or a share car, for example.

For example, as the vehicle information, controller 408 acquires a characteristic portion as a rental car or share car, the characteristic portion being extracted from the image captured using first camera 405. Controller 408 determines using the acquired vehicle information whether the stopped vehicle is a rental car or a share car. It should be noted that examples of the characteristic portion of the rental car or share car may include: an indication portion of the number plate indicating that the vehicle is a rental car or a shear car; and a portion of the exterior of the vehicle at a predetermined position, the portion being provided with a mark indicating that the vehicle is a rental car or a share car.

Further, in the above-described embodiment, it has been illustratively described that the roof portion and windshield portion of the vehicle are employed as the characteristic portion of the taxi to determine whether or not the stopped vehicle is an electrically powered vehicle used as a taxi. However, instead of or in addition to the above-described portions, the color of the number plate or the front surface of the vehicle may be extracted as the characteristic portion of the taxi, and the extracted characteristic portion may be used as a criterion for determining whether or not the stopped vehicle is an electrically powered vehicle used as a taxi. For example, when at least the color of the number plate is not a color representing commercial use of vehicle, controller 408 may determine that the stopped vehicle is not an electrically powered vehicle used as a taxi. Alternatively, for example, when a vehicle type specified from a front surface of a vehicle represents a type of vehicle limited to use as taxi, controller 408 may determine that the stopped vehicle is an electrically powered vehicle used as a taxi.

Further, in the above-described embodiment, it has been described that the image captured using first camera 405 is used to determine whether or not the stopped vehicle is an electrically powered vehicle used as a taxi. However, for example, the image captured using second camera 406 may be used in addition to the image captured using first camera 405 to determine whether or not the stopped vehicle is an electrically powered vehicle used as a taxi. That is, for example, in addition to using the vehicle information acquired using an image captured using first camera 405 to determine whether or not the vehicle is a vehicle used as a taxi, when an image indicating the power receiving device is included in the image of the lower surface of the vehicle captured using second camera 406, controller 408 may determine that the stopped vehicle is an electrically powered vehicle. In this way, it can be precisely determined whether or not the stopped vehicle is an electrically powered vehicle used as a taxi.

Further, in the above-described embodiment, it has been described that the image captured using first camera 405 is used to determine whether or not the stopped vehicle is an electrically powered vehicle used as a taxi. However, for example, instead of the image captured using first camera 405, the image captured using second camera 406 may be used to determine whether or not the stopped vehicle is an electrically powered vehicle used as a taxi. For example, when a predetermined mark is provided to a predetermined position of a lower surface of an electrically powered vehicle used as a taxi, whether or not the stopped vehicle is the electrically powered vehicle used as a taxi may be determined in accordance with whether or not an image indicating the predetermined mark is included in the image captured using second camera 406 at a portion corresponding to the predetermined position of the lower surface of the electrically powered vehicle. In this way, it can be precisely determined whether or not the stopped vehicle is an electrically powered vehicle used as a taxi.

Further, in the above-described embodiment, it has been described that when it is determined that the stopped vehicle is not an electrically powered vehicle used as a taxi, the predetermined information is notified using notification device 416. However, for example, in the case where the stopped vehicle is an electrically powered vehicle used as a taxi and charging is permitted, when the positional relation between power receiving device 150 and power transmitting device 404 is not such a positional relation that contactless charging control can be performed, notification device 416 may be used to notify that the positional relation is not such a positional relation that contactless charging control can be performed, or to instruct to move the vehicle (for example, direction or distance to move) to bring the vehicle into such a positional relation that contactless charging control can be performed.

In the above-described embodiment, it has been described that controller 408 acquires the image captured using first camera 405, which is an external device external to contactless charging device 400, as the information indicating that electrically powered vehicle 100 is stopped in stop space 200, and determines using the acquired information whether or not the vehicle stopped in stop space 200 is electrically powered vehicle 100. However, the external device is not particularly limited to first camera 405. The external device may be, for example, electrically powered vehicle 100, or a management server that manages the location of electrically powered vehicle 100.

For example, when communication with electrically powered vehicle 100 is established or when information indicating that electrically powered vehicle 100 is a taxi is received from electrically powered vehicle 100, controller 408 may determine that the vehicle stopped in stop space 200 is electrically powered vehicle 100 used as a taxi.

Alternatively, for example, electrically powered vehicle 100 acquires the current location of electrically powered vehicle 100 based on a signal (electromagnetic wave) from a GPS (Global Positioning System) satellite, and transmits a signal (location information) indicating the current location of electrically powered vehicle 100 to the management server. When the current location of electrically powered vehicle 100 is stop space 200, the management server may transmit, to contactless charging device 400, information indicating that the vehicle stopped in stop space 200 is a vehicle used as a taxi. When controller 408 receives the information from the management server, controller 408 may determine that the vehicle stopped in stop space 200 is electrically powered vehicle 100 used as a taxi.

Also in this way, when the vehicle stopped in stop space 200 is a taxi, contactless charging can be performed. As a result, by utilizing contactless charging device 400 during the standby in the standby site for taxi, service can be continuously provided as taxi.

Further, in the above-described embodiment, it has been described that the image of the portion at the position corresponding to the characteristic portion of the taxi is acquired as the vehicle information from the image of the vehicle, and whether or not the vehicle stopped in stop space 200 is electrically powered vehicle 100 used as a taxi is determined by determining, through image analysis, whether or not the image of the portion is matched with the characteristic portion of the taxi. However, for example, an image of the entire vehicle may be used to determine, through image analysis, whether or not the vehicle corresponds to a taxi.

It should be noted that all or parts of the above-described modifications may be combined and implemented as appropriate.

Although the embodiments of the present disclosure have been described and illustrated in detail, it is clearly understood that the same is by way of illustration and example only and is not to be taken by way of limitation, the scope of the present disclosure being interpreted by the terms of the appended claims. The scope of the present disclosure is defined by the terms of the claims, and is intended to include any modifications within the scope and meaning equivalent to the terms of the claims.

What is claimed is:

1. A contactless charging device capable of contactlessly charging a power storage device mounted on an electrically powered vehicle used to provide a predetermined service, the electrically powered vehicle including a power receiving device that receives power from the contactless charging device, the contactless charging device comprising:
   a power transmitting device, installed under the ground, which is capable of transmitting the power to the power receiving device when the electrically powered vehicle is stopped at a predetermined position in a stop space set as a standby site for the electrically powered vehicle;
   an acquisition device that acquires, from an external device external to the contactless charging device, information indicating that the electrically powered vehicle is stopped in the stop space; and
   a controller that controls the power transmitting device, wherein
   the controller determines, using the information acquired using the acquisition device, whether or not a vehicle stopped in the stop space is the electrically powered vehicle used to provide the predetermined service,
   when it is determined that the vehicle is the electrically powered vehicle used to provide the predetermined service, the controller permits transmission of power from the power transmitting device to the power receiving device,
   the external device includes an image capturing device, the image capturing device includes a first camera and a second camera,
   the first camera captures an image of an exterior portion of the vehicle stopped in the stop space,
   the second camera captures an image of a predetermined position of a lower surface of the vehicle stopped in the stop space, and
   when a characteristic portion of the electrically powered vehicle used to provide the predetermined service is included in the image of the exterior portion of the vehicle, as captured by the first camera, and a predetermined image of the power receiving device is included in the image of the predetermined position of the lower surface of the vehicle, as captured by the second camera, the controller determines that the vehicle stopped in the stop space is the electrically powered vehicle used to provide the predetermined service.

2. The contactless charging device according to claim 1, wherein when it is determined that the vehicle stopped in the stop space is not the electrically powered vehicle used to provide the predetermined service, the controller prohibits the transmission of power from the power transmitting device to the power receiving device.

3. The contactless charging device according to claim 1, wherein
   the electrically powered vehicle is a taxi, and
   the power transmitting device is installed in the stop space set as a standby site for the taxi.

4. The contactless charging device according to claim 1, wherein
   the electrically powered vehicle is a bus, and
   the power transmitting device is installed in the stop space set as a standby site for the bus.

5. The contactless charging device according to claim 1, wherein when it is determined that the vehicle stopped in the stop space is not the electrically powered vehicle used to provide the predetermined service, the controller notifies that the vehicle stopped in the stop space is not to be charged.

6. A method of performing contactless charging by using a power transmitting device to transmit power to a power storage device mounted on an electrically powered vehicle used to provide a predetermined service, the electrically powered vehicle including a power receiving device that receives the power from the power transmitting device when the electrically powered vehicle is stopped at a predetermined position in a stop space set as a standby site for the electrically powered vehicle, the method comprising:
   acquiring, from an external device, information indicating that the electrically powered vehicle is stopped in the stop space;
   determining, using the acquired information, whether or not a vehicle stopped in the stop space is the electrically powered vehicle used to provide the predetermined service; and
   permitting transmission of power from the power transmitting device to the power receiving device when it is determined that the vehicle stopped in the stop space is the electrically powered vehicle used to provide the predetermined service, wherein
   the acquiring information, from an external device, includes:
   capturing, via a first camera of the external device, an image of an exterior portion of the vehicle stopped in the stop space, and
   capturing, via a second camera of the external device, an image of a predetermined position of a lower surface of the vehicle stopped in the stop space, and
   the determination that the vehicle stopped in the stop space is the electrically powered vehicle used to provide the predetermined service is made when a characteristic portion of the electrically powered vehicle used to provide the predetermined service is included in the image of the exterior portion of the vehicle, as captured by the first camera, and a predetermined image of the power receiving device is included in the image of the predetermined position of a lower surface of the vehicle, as captured by the second camera.

* * * * *